United States Patent

[11] 3,604,245

| [72] | Inventor | Edmond J. Atelian<br>San Carlos, Calif. |
|---|---|---|
| [21] | Appl. No. | 886,937 |
| [22] | Filed | Dec. 22, 1969 |
| [45] | Patented | Sept. 14, 1971 |
| [73] | Assignee | Western Gear Corporation |

[54] TIRE TESTING APPARATUS
7 Claims, 4 Drawing Figs.

[52] U.S. Cl. .................................................... 73/8,
51/108 R, 73/146, 157/13
[51] Int. Cl. ...................................................... G01n 3/56
[50] Field of Search .......................................... 73/8, 146;
157/13; 51/106, 108 R

[56] References Cited
UNITED STATES PATENTS
| 1,669,622 | 5/1928 | Messer ......................... | 73/8 |
| 2,131,979 | 10/1938 | Seidl ............................ | 73/8 |

OTHER REFERENCES
Publication: " Laboratory Method for Measuring Tire Tread Wear" in the N.B.S. Technical News Bulletin, pages 209–210 Dec., 1960.

*Primary Examiner*—Louis R. Prince
*Assistant Examiner*—Daniel M. Yasich
*Attorney*—Gordon Wood ABSTRACT: Tire testing apparatus which includes a relatively large rotating rod drum provided with a plurality of wheel mounts substantially equally spaced around the entire periphery of the road drum and each adapted to rotatably support a wheel on which a tire to be tested is mounted. Means is provided for indexing the mounts about the road drum in order to permit the convenient mounting and removal of wheels with respect to each wheel mount. The apparatus insures that the loading on all tires undergoing tests is equal.

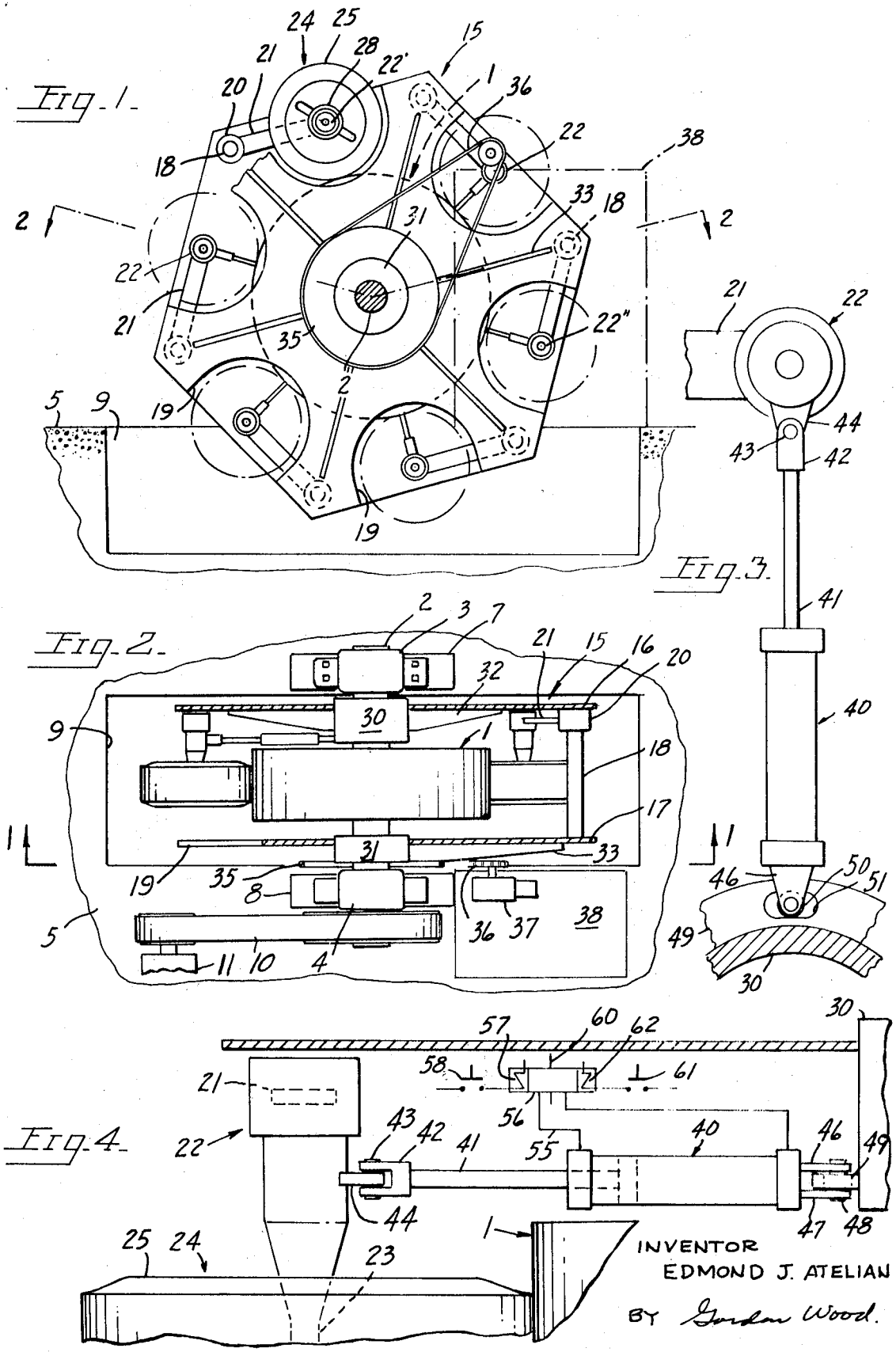

TIRE TESTING APPARATUS

This invention relates to a tire testing apparatus for simultaneously testing a plurality of tires under accurate predetermined loading. The type of apparatus to which the invention pertains requires, according to government specifications, a road drum about 67 inches in diameter representing 1/300th part of a mile. Such drum is rotated at a predetermined speed and a plurality of wheels are mounted at points around the drum so that the tires on the wheels are in rolling engagement with the road drum. Tire testing apparatus of the subject type presently available normally comprises a plurality (usually four) of wheel mounts, two of which are usually horizontally spaced apart along the diameter of the road drum, and two additional mounts which are positioned upwardly from the two arranged on the horizontal diameter. Certain disadvantages are inherent in the apparatus heretofore available.

One disadvantage of prior testing apparatus is that great difficulty and danger attends the mounting and removal of a wheel from the wheel mount while the apparatus is running and it has heretofore been necessary to stop the entire apparatus in order to change the one wheel if optimum safeguards are to be followed.

Another disadvantage of presently available tire testing apparatus is that it is difficult to obtain equal loading on all tires in view of the fact that the mounting means for all tires are arranged differently and frictional effects on the means through which the loading is accomplished are not equal.

Other disadvantages of prior tire testing apparatus are: for the number of tires tested an inordinate amount of space has been required; difficulty has been encountered in insuring that the line of action of the loading force on the tire is exactly radial with reference to the road drum, dangers to personnel from blow outs of the tires under test have not been eliminated, and the resultant reaction on the base of the machine has usually required extremely heavy structural elements and hold down means.

The main object of the present invention is to eliminate most of the disadvantages of prior art testing apparatus presently available.

Another object of the invention is the provision of a tire testing apparatus which permits the mounting and removal of a test wheel to be carried out with complete safety without stopping the road drum and without affecting the testing of the remaining of the remaining wheels.

Still another object of the invention is the provision of apparatus in which the tire mounts, which are spaced apart around the road drum, are supported for movement to a fixed position constituting a station at which personnel may work on the tire without danger of injury to said personnel.

Another object of the invention is the provision of a tire testing apparatus which insures that the loading on the tires is identical for all tires undergoing tests at the same time.

Other objects and advantages will be apparent from the following specification and from the drawings:

FIG. 1 is a vertical elevation of an apparatus constructed in accordance with the present invention and showing the foundation on which it is supported in section. The view is taken in a plane indicated by lines 1—1 of FIG. 2.

FIG. 2 is a horizontal section taken in a plane indicated by lines 2—2 of FIG. 1 and showing the top of the personnel enclosure in plan view.

FIG. 3 is a greatly enlarged fragmentary cross-sectional view through the apparatus, showing the means for applying the loading to the tire under a test.

FIG. 4 is a view at right angles to FIG. 3 and showing part of the fluid pressure system.

In detail, and first with reference to FIG. 1, the invention is adapted to be employed with a standard tire testing road drum generally designated 1 and mounted on a shaft 2 rotatably supported in bearings 3, 4 which in turn are spaced upwardly from the floor 5 by means of rigid pedestals 7, 8 respectively. The shaft 2 is driven by means of a belt 10 from a drive motor indicated at 11. The road drum 1 is of standard construction and has a diameter of 67.227 inches corresponding to 1/300th part of a mile. An upwardly opening recess 9 is formed in floor 5 to accommodate the larger portion of wheel 15.

The present invention comprises a relatively large wheel, generally designated 15, and which includes a pair of sideplates 16, 17 positioned on opposite side of the road drum 1. Said sideplates 16, 17 of wheel 15 are rigidly secured together at spaced points around their periphery by means of spacer pipes or rods 18, which may be welded at their opposite ends to the inner sides of side plates 16, 17.

Swingably secured to the ends of spacers 18 adjacent to the sideplate 16 are sleeves 20 to each of which is secured one end of an arm 21 which carries at its opposite end a wheel mount generally designated 22 (FIGS. 3,4). As best seen in FIG. 4 each wheel mount 22 is provided at one end with a shaft portion 23 to which is rotatably secured a wheel, generally designated 24, on which tire 25 to be tested is supported. Six wheel mounts 22 are shown in the drawings and said wheel mounts are equally spaced about the entire periphery of the road drum 1. One wheel mount 22' is shown in FIG. 1 with a wheel 24 thereon, and on which wheel is mounted a tire 25 to be tested. It will be understood that all of the remaining five wheel mounts 22 may be employed to support a test tire wheel or may not be provided with a wheel as desired. As indicated in FIG. 1 the wheel mount 22' may be provided with a quick release locking nut 28 to permit fast application of the wheel to the mount or removal therefrom. Sideplate 17 is formed with generally semicircular recesses 19 to permit access to the wheel mounts 22.

The large wheel 15 is rotatably supported as a rigid unit on shaft 2 by means of bearings 30, 31 to which sideplates 16, 17 respectively are secured. To stabilize the assembly further, radially extending stiffeners 32 may be provided on the inner side of sideplate 16, and radially extending stiffeners 33 may be provided on the outer side of sideplate 17.

Fixedly secured to the stiffeners 33 of sideplate 17 is a sprocket wheel 35 which is driven through a chain 36 from a gear motor 37 mounted on top of an enclosure structure 38 which is adapted to receive an employee therein. By operation of the gear motor 37 the entire wheel 15 may be indexed in either direction to bring any one of the wheel mounts 22 to the position of wheel mount 22" shown in FIG. 1, in which position the wheel mount is readily accessible to an operator positioned within enclosure 38.

By the present invention each tire in engagement with road drum 1 is adapted to be urged radially inwardly relative to the axis of shaft 2 by a predetermined force which is equal for all wheel mounts. In the embodiment of the invention illustrated this is achieved by means of a hydraulic cylinder 40 which coacts with each of the wheel mounts 22 as best seen in FIGS. 3, 4. The piston rod 41 of each cylinder 40 is provided at its outer end with a clevis 42 which is pivotally connected by means of a pin 43 with a lug 44 fixedly secured to the wheel mount 22. The opposite end of cylinder 40 is provided with a pair of lugs 46, 47 which are pivotally connected by means of a pin 48 to a ring 49 secured around the periphery of a bearing 30. In order to permit a slight circumferential shifting of pin 48 the same is provided with a roller 50 which is received within a short arcuate slot 51 formed in ring 49. By this structure it will be apparent that when tires of different diameters are tested the inward swinging movement of the arm 21 to which a smaller diameter wheel is secured will cause the wheel mount 22 to move to a different radial line with reference to the axis of shaft 2. In order to permit the cylinder 40 to nevertheless exert a pure radially inwardly directed force it is necessary that the inner end of the cylinder 40 shift peripherally to maintain the line of action of the force exactly through the axis of shaft 2. Since the force exerted by the cylinder 40 is pure tension the roller 50 will automatically move within slot 51 to a position such that the line of action of the force on the tire to be tested is exactly radial. This is an important requirement that must be satisfied if the loading on all tires is to be the same.

As best seen in FIG. 4 the inwardly directed force on wheel mount 22 is achieved by connecting the outer end of cylinder 40 through a fluid pressure line 55 with the "retract" end of a four-way valve 56 actuated by solenoid 57 which may in turn be energized by a pushbutton 58 contained within the enclosure 38. The valve 56 is supplied by a line 60 from a source of constant pressure (not shown) so that the loading on mount 22 may be predetermined with a good degree of exactness. When a mount is at position 22" (FIG. 1) and it is desired to apply or remove a wheel a pushbutton 61 within enclosure 38 may be actuated to cause the solenoid 62 corresponding to the "advance" side of four-way valve 56 to apply the pressure to the opposite end of cylinder 40 and to urge the wheel 24 away from the road drum 1. It will be understood that each wheel mount and each cylinder 40 is provided with an operating valve 56 and with pushbuttons within the enclosure 38 the same as those in FIG. 4. By this arrangement an operator, safe within the enclosure 38, may employ gear motor 37 to bring any one of the tire mounts 22 to the position of tire mount 22" (shown in FIG. 1) so that the tire may be retracted from the road drum 1 and the wheel mount worked upon without affecting the operation of the remaining wheel mounts, the tires of which may remain in engagement with the rotating road drum 1.

It will be apparent that the above-described structure not only provides a method of loading all tires with the same radially inwardly directed force but also permits all six of the wheel mounts shown to be operated. Furthermore, it will be apparent that the resultant loading on the bearings 3, 4 and pedestals 7, 8 works out to be zero insofar as the forces applied by the wheel mounts is concerned when all of the wheel mounts are loaded. This is a desirable result since it permits the use of a much lighter supporting structure than in the unbalanced arrangements of the prior art. Even when less than the full number of tire mounts are being employed the forces exerted on the supporting structure tend to offset each other so that an undue amount of resultant force is not required to be resisted by the supporting structure.

By the prior art structure it will be apparent that considerable difficulty has been experienced in handling the upper tires that are above the tires at the level of the working platform. By the present invention all of the tires and all of the mounts are operated on in the same manner so that danger to the operator is minimized. The provision of the enclosure 38 provides an additional safeguard and, if desired, various interlocks (not shown) may be employed in conjunction with access doors in enclosure 38 to prevent indexing of the wheel 15 while the operator is at the loading station.

It is emphasized that the above-disclosed structure facilitates the application of precisely the same loading on each tire being tested so that the value of the test results is considerably enhanced.

It will be apparent that the radially inwardly directed forces created by the cylinders 40 need not be the same for all wheel mounts and, if desired, the radial loading on the test tires may readily be varied by varying the fluid pressure applied to cylinders 40.

We claim:
1. Tire testing apparatus comprising:
   a rotatably supported road drum,
   a plurality of wheel mounts at spaced points around the periphery of said road drum for rotatably supporting each one of a plurality of wheels in rolling engagement with the periphery of said drum,
   means supporting said mounts for movement as a unit about the axis of rotation of said drum to permit any one mount to be moved to a particular fixed point with reference to the periphery of said drum permitting accessibility to a selected wheel without affecting the testing of the other wheels.
2. Apparatus according to claim 1 wherein said mounts are carried by a wheel supported for rotation about the axis of said drum.
3. Apparatus according to claim 2 wherein said drum includes a central shaft rotatably supported in bearings and said wheel includes a central bearing rotatably supported on the shaft of said drum.
4. Apparatus according to claim 3 wherein an indexing device is cooperatively associated with said wheel to permit rotating said wheel.
5. Tire testing apparatus comprising:
   a rotatably supported road drum,
   a wheel mount positioned outwardly of said drum for mounting the tire to be tested
   means positioned inwardly of said mount for exerting an inwardly directed force on said mounts relative to said drum to move the tire against the drum and
   means for automatically shifting said last mentioned means to a position with the line of action of said force intersecting the axis of said drum.
6. Apparatus according to claim 5 wherein said mount includes a shaft for supporting a wheel and an arm swingably connecting the shaft to a housing to permit said shaft to support wheels of different outside diameter.
7. Apparatus according to claim 6 wherein said means for exerting said inwardly directed force is a fluid actuated cylinder connected at its inner end to an element supported for circumferential movement relative to the axis of said drum.